United States Patent [19]
Nishikawa et al.

[11] Patent Number: 4,771,852

[45] Date of Patent: Sep. 20, 1988

[54] FOUR WHEEL DRIVE VEHICLE TRANSFER AND CONTROL APPARATUS

[75] Inventors: Seiichi Nishikawa, Toyokawa; Kenichi Yoshizawa, Toyota, both of Japan

[73] Assignee: Toyota Jidosha Kabushiki Kaisha, Toyota, Japan

[21] Appl. No.: 868,053

[22] Filed: May 29, 1986

[30] Foreign Application Priority Data

| Jun. 5, 1985 | [JP] | Japan | 60-122342 |
| Jun. 5, 1985 | [JP] | Japan | 60-122346 |
| Jun. 14, 1985 | [JP] | Japan | 60-129454 |
| Jul. 3, 1985 | [JP] | Japan | 60-146059 |

[51] Int. Cl.⁴ .................................. B60K 17/34
[52] U.S. Cl. ................... 180/247; 192/3.57
[58] Field of Search ............. 180/233, 244, 247, 248, 180/249; 74/867, 868, 869, 740, 785; 192/3.57

[56] References Cited

U.S. PATENT DOCUMENTS

| 4,503,927 | 3/1985 | Hayakawa | 180/247 |
| 4,673,072 | 6/1987 | Hosono | 180/247 |

FOREIGN PATENT DOCUMENTS

| 140321 | 10/1979 | Japan | 180/233 |
| 39346 | 4/1981 | Japan | 180/247 |
| 131426 | 10/1981 | Japan | 180/233 |
| 8301928 | 6/1983 | World Int. Prop. O. | 180/233 |
| 2063790 | 6/1981 | United Kingdom | 180/247 |
| 2108221 | 5/1983 | United Kingdom | 180/233 |

Primary Examiner—John J. Love
Assistant Examiner—Everett G. Diederiks, Jr.
Attorney, Agent, or Firm—Oblon, Fisher, Spivak, McClelland & Maier

[57] ABSTRACT

A transfer in combination with a transmission mechanism for a four wheel drive vehicle is provided comprising a first output shaft aligned with the transmission mechanism, a second output shaft extending parallel to the first output shaft, a power transmission mechanism for transmitting driving force from the first to the second output shaft, and a clutch coaxially mounted on the second output shaft for connecting and disconnecting the second output shaft to and from the power transmission mechanism. In addition to the clutch between the second output shaft and the power transmission mechanism, another clutch may be provided between the first output shaft and the power transmission mechanism. The transmission/transfer further includes parking locks for stopping the rotation of the first and second output shafts. A control apparatus is associated with the clutches between the first and second output shafts and the power transmission mechanism and includes a delay unit for providing a time lag between the engagements of the clutches.

19 Claims, 10 Drawing Sheets

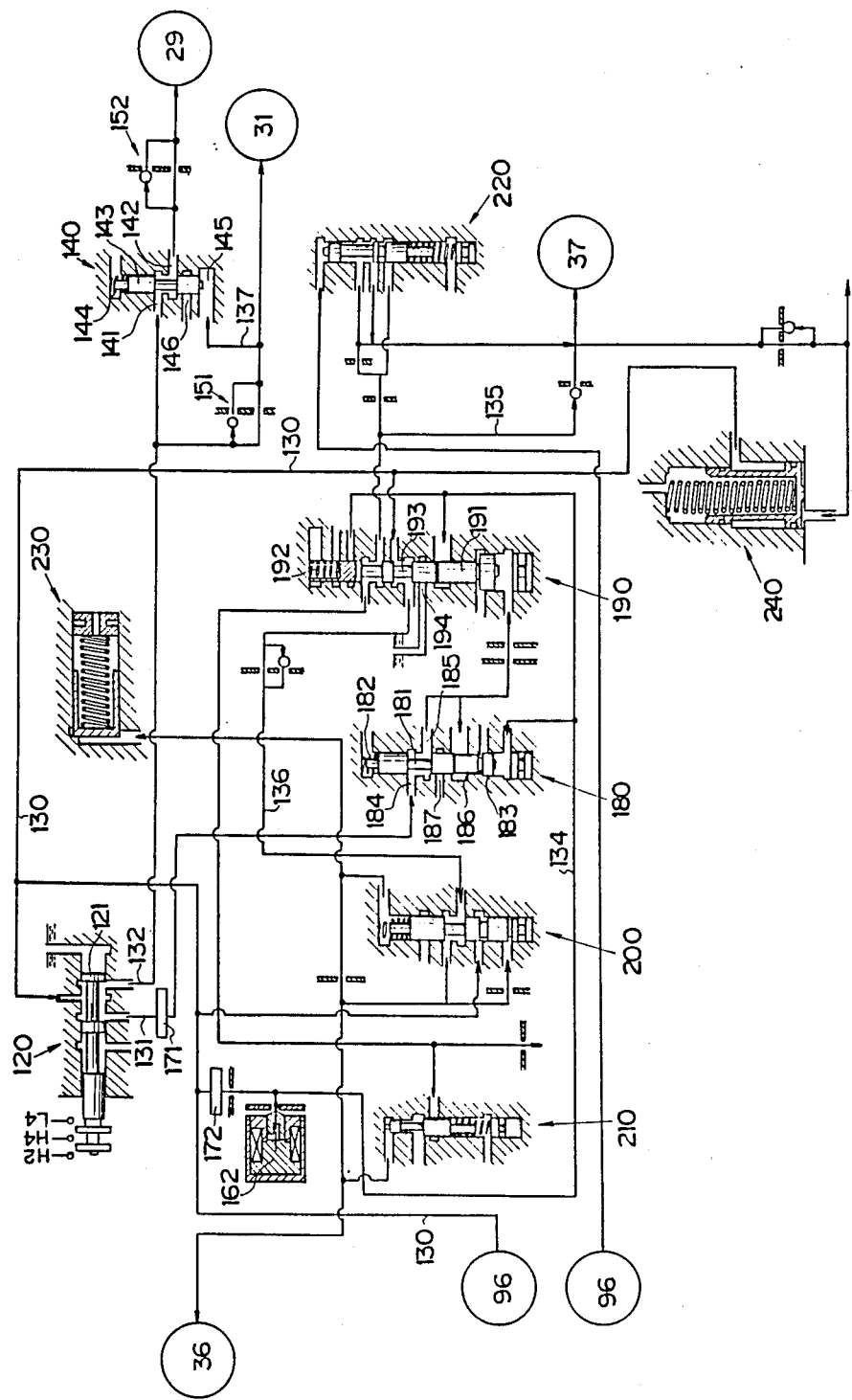

FOUR WHEEL DRIVE VEHICLE TRANSFER AND CONTROL APPARATUS

BACKGROUND OF THE INVENTION

This invention relates to a transfer loaded on a four wheel drive vehicle and capable of changing the drive mode between two wheel drive and four wheel drive and a control apparatus for providing such a change between two wheel drive and four wheel drive.

This type of transfer is generally designed such that the rotational force of the rear wheel output shaft is transmitted to the front wheel output shaft via a clutch and a power transmission mechanism whereby a selection is made between four wheel drive and two wheel drive by connecting and disconnecting the clutch. One typical tranfer is briefly described. Referring to FIG. 15, there is illustrated in schematic view the apparatus disclosed in Japanese Patent Application Kokai No. 56-39352 which is incorporated herein by reference. A region defined by dot-and-dash lines in FIG. 15 designates an overall automatic transmission/transfer 1 including main and auxiliary transmissions 2 and 3 both having a planetary gear mechanism, a clutch, and a brake as main elements. The main transmission 2 is connected to an engine 5 through a torque converter 4. A front wheel output shaft 7 extends parallel to a rear wheel output shaft 6 which extends from the auxiliary transmission 3 as its output shaft. The rear and front wheel output shafts 6 and 7 are connected via a clutch 8 and a power transmission mechanism 9. An intermediate shaft 10 is coaxially mounted on the rear wheel output shaft 6 and connected to the rear wheel output shaft 6 through the clutch 8. A chain 13 is extended over sprockets 11 and 12 secured to the intermediate shaft 10 and the front wheel output shaft 7, respectively. Two wheel drive is achieved with the clutch 8 disconnected because the rotational force imparted to the rear wheel output shaft 6 from the engine 5 is no longer transmitted to the front wheel output shaft 7. Four wheel drive is achieved by connecting the clutch 8. A selection can thus be made between two wheel drive and four wheel drive by connecting and disconnecting the clutch 8.

Four wheel drive vehicles were traditionally most often used as transport in mountainous, snowy, and desert areas. The recent trend of diversified civil demands is also true in the vehicle industry. There is a need for small size passenger cars to be of four wheel drive type for recreation and other purposes. In an automatic transmission/transfer of the type as shown in FIG. 15, however, the transfer comprised of the two/four wheel drive changeover clutch 8 and the power transmission mechanism 9 is aligned with the main and auxiliary transmissions 2 and 3, and the entire distance from the engine 5 to the end of the rear wheel output shaft 6 is thus considerably long. It is then difficult to load vehicles having a relatively short wheel base such as small-size passenger cars with such an automatic transmission/transfer. If loaded, the passenger compartment must be reduced in volume, detracting from the available space and comfort.

In the arrangement shown in FIG. 15, since the front wheel output shaft 7 is connected to a front axle via a propeller shaft and a differential gear mechanism (not shown), connection of the clutch 8 allows the power to be transmitted to the front wheels. Differently stated, the power transmission mechanism 9 comprised of the chain 13 and the intermediate shaft 10 is interlocked with the front wheel output shaft 7 and the propeller shaft with respect to rotational motion. Then, a so-called intermediate mechanism including the power transmission mechanism 9 and the front wheel output shaft 7 is rotated by the power transmitted from the rear wheel output shaft 6 and even by the power transmitted from the front wheels. Consequently, when the clutch 8 is disconnected to provide for two wheel drive, the rotational force of the rear wheel output shaft 6 is not directly transmitted to the power transmission mechanism 9 and the front wheel output shaft 7, but the rotation of the front wheels during running causes the front wheel output shaft 7 and the power transmission mechanism 9 to unnecessarily rotate, leading to a power loss, and hence, problems of low fuel consumption and the like.

In general, automatic transmission/transfer combined systems are hydraulically controlled. When the engine is stopped, control is lost because of the loss of any available hydraulic pressure. In order to stop the rotation of the rear wheels in parking state, a parking equipment is added wherein a parking lock pawl engages with a parking gear attached to the outside of a member integrally combined with the rear wheel output shaft, for example, a clutch drum. In the four wheel drive vehicle automatic transmission/transfer of the arrangement shown in FIG. 15, however, the two/four wheel drive changeover clutch 8 is generally a wet clutch operable by a hydraulic oil pressure as used in the main and auxiliary transmissions 2 and 3. With this arrangement, when the car is stopped in the four wheel drive mode and the engine is stopped to provide the parking state, the rear wheels are locked by the aforementioned parking equipment. The front wheels, however, are left for free rotation because the clutch 8 receives no hydraulic oil pressure due to the stopping of the engine and is thus maintained disconnected. As a result, the car is kept standstill only by the rear wheels. Differently stated, a force required to keep the car standstill is supported by the two rear wheels as soon as the engine is stopped.

A further problem involved in the prior art four wheel drive vehicle transmission/transfer shown in FIG. 15 is a power loss due to co-rotation that the power transmission mechanism 9 is rotated together with the front wheels even in the two wheel drive mode. This also adversely affects fuel consumption.

Such an inconvenient problem may be eliminated by disposing an additional clutch between the front wheel output shaft 7 and the power transmission mechanism 9. The additional clutch interrupts the rotational force transmitted from the front wheels in the two wheel drive mode, thereby preventing the unnecessary rotation of the power transmission mechanism 9. The provision of the two clutches is effective in that the power transmission mechanism 9 is maintained stationary by releasing both the aforementioned two/four wheel drive changeover clutch 8 and the additional clutch in the two wheel drive mode to interrupt power transmission. The power transmission mechanism 9 is not rotated unless both the clutches are connected to provide the four wheel drive. In the two wheel drive mode, the rear wheel output shaft 6 is rotated by the power from the engine 5 and the front wheel output shaft 7 is rotated upon receipt of the rotational force from the front wheels. If a change is made from the two wheel drive to the four wheel drive during run, the power transmission mechanism 9 receives rotational forces from both the rear and front wheel output shafts 6 and 7. At this point of changeover to the four wheel drive mode, the power transmission mechanism 9 quickly starts rotating from the stationary state and must transmit a great power at the same time so that the engagement characteristics of the respective clutches are unstable in transient state, probably resulting in the reduced life of the clutches and the power transmission mechanism.

The aforementioned clutches generally employ hydraulic clutches in order to enable connection during run and enable interlocking with the automatic transmission mechanism. When a certain hydraulic pressure is applied to both the clutches to provide the four wheel drive, not only the transient engagement characteristics of the respective clutches are unstable as mentioned above, but there can occur a reduction in the hydraulic pressure, inviting the relaxation of clutch connection and adversely affecting other clutches in case of an automatic transmission/transfer. It is thus very difficul to optimize control parameters.

The provision of two clutches for the selection between two wheel drive and four wheel drive thus requires a special control operation.

SUMMARY OF THE INVENTION

A primary object of the present invention is to provide a four wheel drive vehicle transmission/transfer whose entire length is reduced. This object is achieved by a transfer comprising a first output shaft disposed on the same axis as the engine via a speed change or transmission mechanism and a second output shaft extending substantially parallel to the first output shaft and adapted to receive a rotational force from the first output shaft via a power transmission mechanism, wherein a clutch is coaxially mounted on the second output shaft for connecting and disconnecting the second output shaft to and from the power transmission mechanism to provide a change between two and four wheel drive modes.

A second object of the present invention is to provide a four wheel drive vehicle transmission/transfer wherein clutches are provided on both the forward and backward stages of a power transmission mechanism for enabling four wheel drive whereby the power loss produced thereacross is reduced. This object is achieved by a transfer comprising a first output shaft adapted to be driven for rotation by the engine via a speed change or transmission mechanism and a second output shaft adapted to receive a rotational force from the first output shaft via a power transmission mechanism, wherein a two/four wheel drive changeover clutch is interposed between the first output shaft and the power transmission mechanism and another clutch is interposed between the power transmission mechanism and the second output shaft.

A third object of the prssent invention is to provide a four wheel drive vehicle transmission/transfer whereby the vehicle can be maintained in the parking state by preventing rotation of all four wheels. This object is achieved by a transfer comprising a first output shaft adapted to be driven for rotation by the engine via a speed change or transmission machanism and kept stationary by first parking means and a second output shaft adapted to receive a rotational force from the first output shaft via a two/four wheel drive changeover clutch and a power transmission mechanism, wherein second parking means is provided for keeping the second output shaft prevented from rotation.

A fourth object of the present invention is to provide a four wheel drive vehicle transmission/transfer comprising delay means for ensuring that either one of clutches inserted at both the forward and backward stages of a power transmission mechanism for enabling four wheel drive is connected before the other clutch is connected, thereby achieving a smooth changeover to four wheel drive. This object is achieved by a transfer comprising a first output shaft adapted to be driven for rotation by the engine via a speed change or transmission machanism, a power transmission mechanism connected to the first output shaft via a first two/four wheel drive changeover clutch, a second output shaft connected to the power transmission mechanism via a second clutch, and control means for controlling the first and second clutches, wherein the control means includes delay means for ensuring that either one of the first and second clutches is connected before the other clutch is connected at the time of changeover from two wheel drive to four wheel drive. Other objects are in part apparent and will in part become understood from the following description.

BRIEF DESCRIPTION OF THE DRAWINGS

FIG. 14 is a diagram showing a hydraulic oil circuit used in a third embodiment of the control apparatus according to the present invention.

DESCRIPTION OF THE PREFERRED EMBODIMENTS

Figure 1:
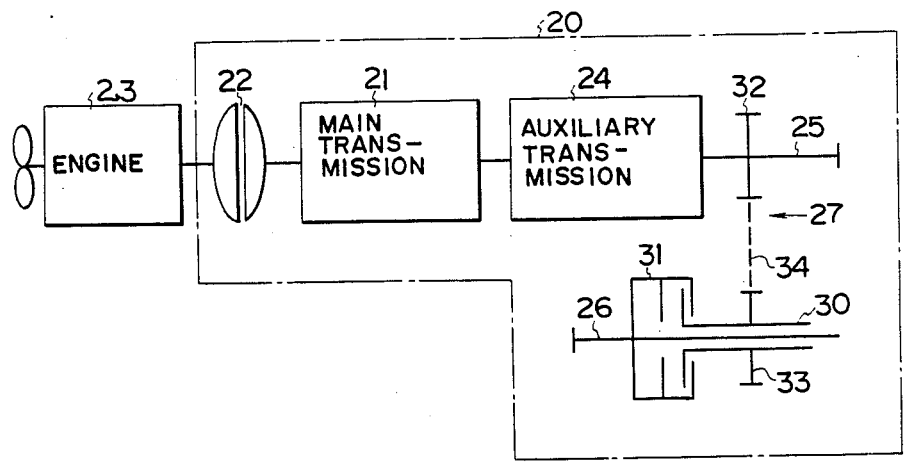
FIG. 1 is a schematic view illustrating the outline of a transmission/transfer according to one embodiment of the invention.

Referring to FIG. 1, there is schematically illustrated a four wheel drive vehicle transmission/transfer combined apparatus having a reduced entire length. An automatic transmission/transfer which is herein often simply referred to as transfer is illustrated at 20 in a region defined by dot-and-dash lines as including a main transmission 21 for shifts among forward four speeds and backward one speed, which is connected to an engine 23 via a torque converter 22. On the backward stage of main transmission 21 is disposed an auxiliary transmission 24 for a shift between high speed drive (H) and low speed drive (L) having an output shaft which serves as a rear wheel output shaft 25. A front wheel output shaft or part-time drive shaft 26 is extended parallel to rear wheel output shaft 25. The rear and front wheel output shafts 25 and 26 are releasably interlocked through a power transmission mechanism 27 and a two/four wheel drive changeover clutch 31. A driven shaft 30 is coaxially mounted for rotation on front wheel output shaft 26, and clutch 31 is coaxially mounted on front wheel output shaft 26 for providing connection and disconnection between front wheel output shaft 26 and driven shaft 30. The power transmission mechanism 27 includes a chain 34 which is extended over sprockets 32 and 33 secured to rear wheel output shaft 25 and driven shaft 30, respectively.

In the embodiment shown in FIG. 1, the drive mode may be changed between the two and four wheel drive modes by engaging and releasing clutch 31 on front wheel output shaft 26.

Figure 4:
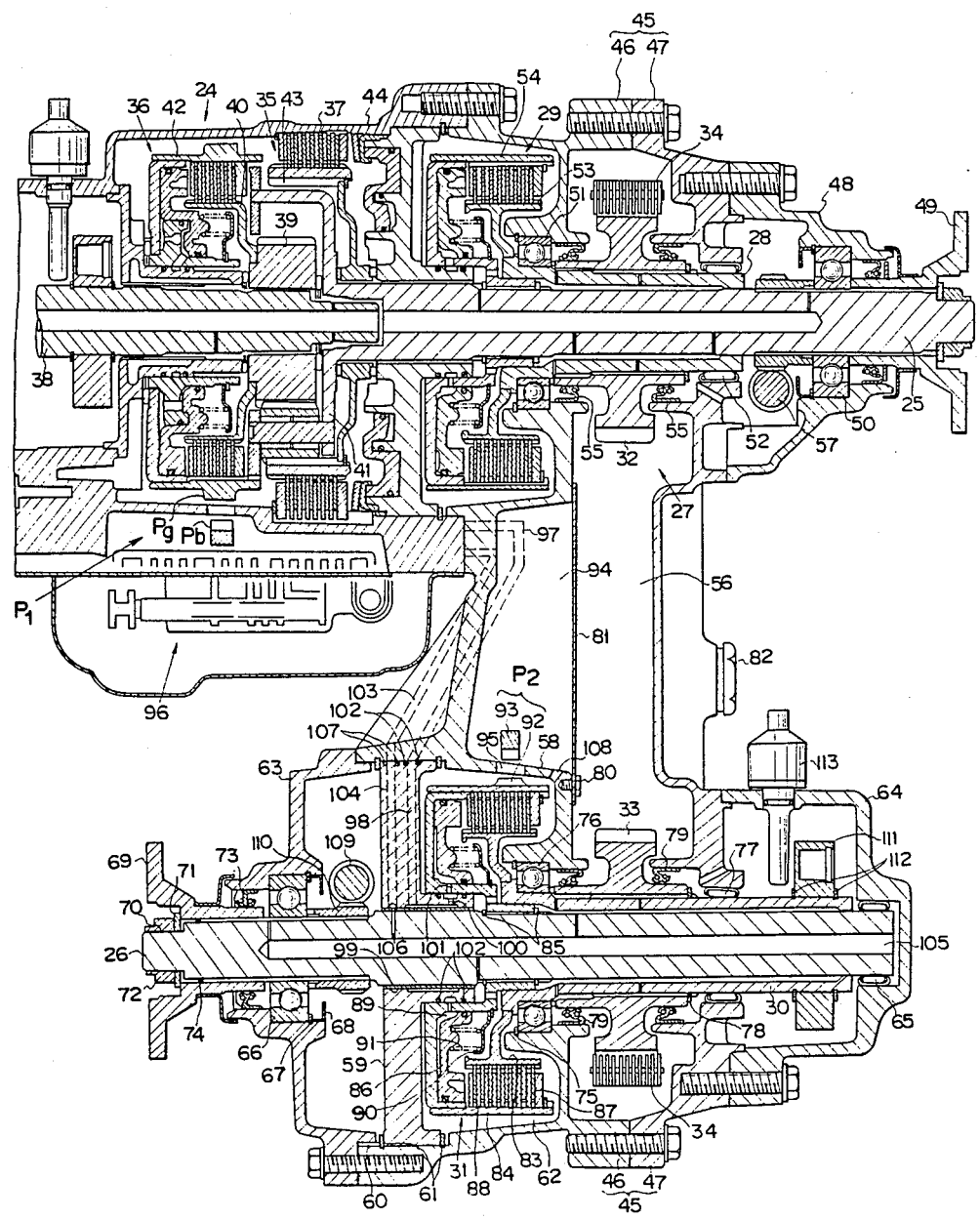
FIG. 4 is a cross-sectional view of the transfer of FIG. 3.

In the above-mentioned arrangement, sprocket 32 is mounted on rear wheel output shaft 25 by engaging them through splines and fitting a snap ring on rear wheel output shaft 25 to secure sprocket 32 fixed in an axial direction (see FIG. 4). Since a certain bending moment is applied to rear wheel output shaft 25 by the engagement of chain 34 with sprocket 32, a bearing structure which can withstand the bending moment must be provided for rear wheel output shaft 25. Only a limited space is required for mounting and accommodating such a bearing structure and sprocket 32 so that the necessary length of rear wheel output shaft 25 may be short enough. Consequently, the entire distance from torque converter 22 to the end of rear wheel output shaft 25 is relatively short.

Figure 2:
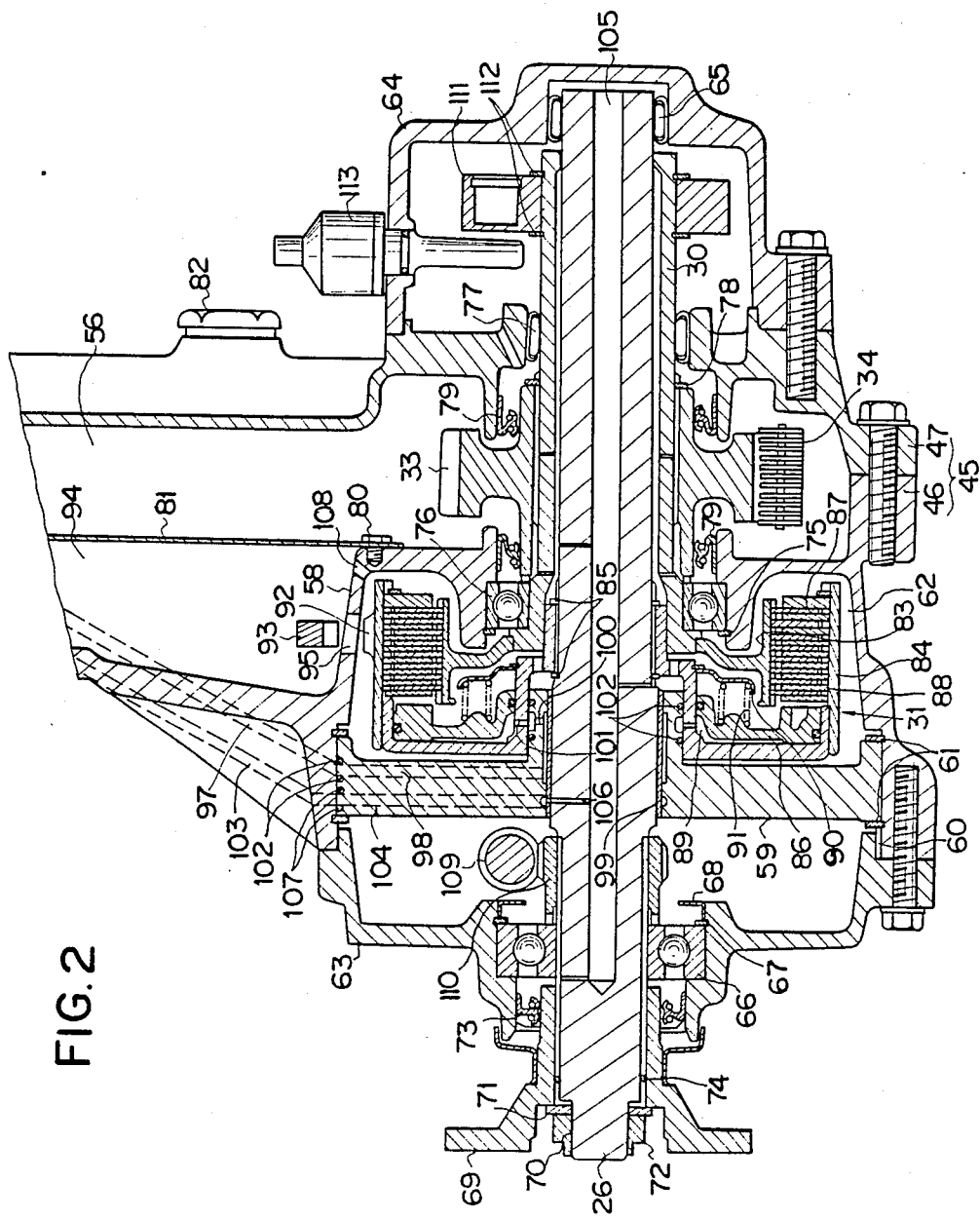
FIG. 2 is a cross-sectional view of that portion of the present transfer associated with the front wheel output shaft.

One illustrative structure of the above-mentioned arrangement is shown in FIG. 2 with respect to the front wheel output shaft 26 side. A chain chamber-defining case 45 consisting of front and rear case segments 46 and 47 for separation into two halves is configured so as to radially extend from the side of rear wheel output shaft 25, and front wheel output shaft 26 is held in the extension. More particularly, the extension of front case segment 46 is integrally formed with a substantially cylindrical enclosure 58. The cylindrical enclosure 58 is slightly tapered rearward in an axial direction of front wheel output shaft 26 to define a cup shaped space which is open at its front side (front side when loaded on a vehicle). A substantially disk shaped clutch support 59 having a boss at the center thereof is fitted in the front opening of enclosure 58 while it is prevented from rotation by key ways 60 and from axial motion by snap rings 61. A clutch chamber 62 is defined between clutch support 59 and enclosure 58. To that portion of front case segment 46 extending forward beyond clutch support 59 is attached a front housing 63 for defining an empty chamber. On the other hand, a rear housing 64 of bottomed cylindrical or cup shape for defining an empty chamber is attached to the rear end of the extension of rear case segment 47 (rear end when loaded on a vehicle).

The front wheel output shaft 26 extends from rear housing 64 throughout enclosure 58, clutch support 59, and front housing 63 and parallel to rear wheel output shaft 25 (see FIG. 4). A rear portion of front wheel output shaft 26 is supported by a bearing 65 held in place in rear housing 64, and a front portion thereof supported by another bearing 66 held in front housing 63. The front bearing 66 is held in a shoulder on front housing 63 and axially retained by a snap ring 67. An annular oil deflector 68 having an L-shaped cross section is disposed in the front housing 63 shoulder inside front bearing 66 in order to provide a continuous supply of lubricant to front bearing 66. On the extension of front wheel output shaft 26 beyond front housing 63 is fitted a companion flange 69 which is secured in place by threadably engaging a nut 72 on a threaded front end portion 70 of front wheel output shaft 26 via a spacer 71. To prevent leakage of lubricant, an oil seal 73 is interposed between the boss of companion flange 69 and front housing 63, and an O-ring 74 is interposed between the outer surface of front wheel output shaft 26 and the inner surface of companion flange 69.

On that portion of the thus supported front wheel output shaft 26 which covers from its center to the rear end is coaxially mounted for relative rotation a driven shaft 30 which is a part of power transmission mechanism 27. The driven shaft 30 is supported for rotation by a bearing 76 fixedly secured by a snap ring 75 to an inner annular flange of enclosure 58 integral with front case segment 46 and by a bearing 77 secured to a bored portion of rear case segment 47. Although front wheel output shaft 26 and driven shaft 30 are coaxially located, front wheel output shaft 26 is supported at its opposed ends outside driven shaft 30 by bearings 65 and 66, and driven shaft 30 are separately supported by other bearings 76 and 77. That is, the support structures for front wheel output shaft 26 and driven shaft 30 are independent from each other so that the influence of front wheel output shaft 26 susceptible to shock and vibration during run is not conveyed to driven shaft 30. This not only allows front wheel output shaft 26 to be supported with a longer span, but also insures the more rigid support of front wheel output shaft 26 and driven shaft 30 in a more durable manner.

The sprocket 33 paired with sprocket 32 as previously mentioned with reference to FIG. 1 is fitted and retained on driven shaft 30 between bearings 76 and 77 by means of splines and a snap ring 78. The chain 34 is extended over sprockets 32 and 33. Oil seals 79 are interposed between the outer surface of the front boss of sprocket 33 on driven shaft 30 and enclosure 58 and between the outer surface of the rear boss of sprocket 33 and rear case segment 47 to separate chain chamber 56 from clutch chamber 62 and the empty chamber in rear housing 64. The chain chamber 56 is also defined and separated within chain chamber-defining case 45 by a partition 81 which is extended parallel to chain 34 and secured on one side to enclosure 58 by bolts 80 and on the remaining sides to corresponding inner surfaces of front case segment 46. The chain chamber 56 is thus kept independent from the other empty chambers or hollow portions by oil seals 79 and partition 81 so that lubrication of chain 34 and sprockets 32, 33 is effected independent of the remainders. It is to be noted that lubricant is supplied to chain chamber 56 by removing a plug 82 from an oil hole in rear case segment 47.

In clutch chamber 62 located nearer to the engine than chain 34 and sprocket 33 of power transmission mechanism 27 is received a two/four wheel drive changeover clutch 31 which provides connection and disconnection between front wheel output shaft 26 and driven shaft 30. The clutch 31 is a hydraulic wet multi-plate clutch which complies with automatic control based on oil hydraulics and allows sliding motion so that a change may be made when the vehicle is running. The driven shaft 30 is integrally formed with a clutch hub 83. A clutch drum 84 in snug fit on the boss of clutch support 59 is engaged on and secured to front wheel output shaft 26 by means of splines and snap rings 85. A piston 86 sealed along its inner and outer peripheries with O-rings is disposed within clutch drum 84 so that it may be moved toward and away from clutch plates 87 and friction plates 88. An oil chamber 89 is defined on the front side of piston 86. A return spring 91 is retained on the rear side of piston 86 by a retainer 90. A parking gear 92 is formed on the outer surface of clutch drum 84. In an empty chamber 94 which is defined in chain chamber-defining case 45 by partition 81, a parking lock pawl 93 to be engaged with parking gear 92 is disposed such that it may be moved toward and away from clutch chamber 62 through an opening 95 in enclosure 58. Means for actuating parking lock pawl 93 may be any hydraulic, electric or mechanical means and interlocked with another parking means for locking rear wheel output shaft 25.

A line for supplying hydraulic fluid to actuate clutch 31 will now be described. An hydraulic oil channel 97 is extended through the wall of front case segment 46 in fluid communication with a hydraulic oil control unit (not shown) associated with auxiliary or main transmission 24 or 21. The hydraulic oil channel 97 is open at the inner surface of front case segment 46 in close engagement with the outer periphery of clutch support 59, through which a hydraulic oil channel 98 is radially extended from the outer periphery to the inner periphery in fluid communication with hydraulic oil channel 97. The inner periphery of clutch support 59 is formed with a shallow recess which is axially extended from the opening of hydraulic oil channel 98 to a certain extent along the inner periphery of the support boss and closed by a bush 99 interposed between the clutch support 59 inner periphery and front wheel output shaft 26, thereby defining an oil path. The boss of clutch support 59 is formed with a hydraulic oil channel 100 extending from the recess to the outer periphery of the boss. The opening of hydraulic oil channel 100 on the boss outer periphery is in communication with an annular groove in the boss outer periphery. That portion of clutch drum 84 snuggly fitted on the boss of clutch support 59 is formed with hydraulic oil channels 101 in communication with the annular groove and oil chamber 89. To prevent leakage of hydraulic oil, sealing rings 102 are interposed between the contact surfaces of front case segment 46 and clutch support 59 and between the contact surfaces of clutch support 59 and clutch drum 84 and across the openings of hydraulic oil channels 97, 98, and 101. The clutch 31 is thus operated by actuating a control valve in the hydraulic oil control unit as will be described later. Hydraulic oil under pressure is introduced into oil chamber 89 through hydraulic oil channels 97, 98, 100, and 101 to cause piston 86 to advance toward the rear (to the right in FIG. 2). Accordingly, clutch plates 87 and friction paltes 88 are brought in pressure contact to connect front wheel output shaft 26 to driven shaft 30. When the control valve is reversely actuated, the hydraulic oil is withdrawn from oil chamber 86. The piston 86 is thus retracted by the action of return spring 91, and the pressure engagement between clutch plates 87 and friction plates 88 is accordingly released to disconnect front wheel output shaft 26 from driven shaft 30.

By arranging the hydraulic oil line in the wall of such members as cases without extending a separate hose or pipe, the construction is made more simple. In addition, since the location of second clutch 31 nearer to the engine with respect to power transmission mechanism 27 comprised of chain 34 makes it unnecessary to extend hydraulic oil channel 97 across power transmission mechanism 27, the line for supplying hydraulic oil is made more simple and reliable, resulting in ease of manufacture.

Like hydraulic oil channel 97, a lubricant oil channel 103 is formed in the wall of front case segment 46. The lubricant oil channel 103 at one end is in fluid communication with a lubricant oil source (not shown) associated with auxiliary transmission 24, and at the other end opens at the inner periphery of front case segment 46 in close contact with the outer periphery of clutch support 59. Like hydraulic oil channel 98 as previously described, a lubricant oil channel 104 is radially extended through clutch support 59 from the outer periphery to the inner periphery thereof in fluid communication with lubricant oil channel 103. The opening of lubricant oil channel 104 on the inner periphery of clutch support 59 is in communication with an annular groove therein. The bush 99 is formed with a slender port opening in the annular groove and extending throughout the thickness thereof. The front wheel output shaft 26 is formed with a lubricating bore 105 extending from the rear end to a position near the front end. A lubricant oil channel 106 is perforated in front wheel output shaft 26 to provide fluid communication between lubricating bore 105 and the slender port in bush 99. The front wheel output shaft 26 is formed with a plurality of lubricant oil branch channels radically extending from bore 105 for the purpose of supplying lubricant oil to the necessary sites. Oil seals 107 are interposed between the contact surfaces of clutch support 59 and front case segment 46 and across the openings of lubricant oil channels 103 and 104 in order to prevent leakage of lubricant oil. Lubricant oil is also supplied to clutch chamber 62. Since opening 95 allowing parking lock pawl 93 to be inserted therethrough is opened in the enclosure 58 separating clutch chamber 62 from empty chamber 94 defined by partition 81, the lubricant oil is splashed into empty chamber 94 through opening 95. Another opening 108 is perforated in enclosure 58 for the purpose of returning the escape lubricant oil into clutch chamber 62.

Within front housing 63 attached to front case segment 46, a speed meter driven gear 109 is located transverse front wheel output shaft 26. The speed meter driven gear 109 is in mesh with a speed meter drive gear 110 fixedly mounted on front wheel output shaft 26. The number of revolution of front wheel output shaft 26 is detectable through meshing gears 109, 110. If free wheel hubs (not shown) of the front wheels are locked in the two wheel drive mode, front wheel output shaft 26 is rotated with the front wheels. If the free wheel hubs are free, the rotation of the front wheels is not transmitted to front wheel output shaft 26 which thus remains stationary. A sensor (not shown) connected to speed meter driven gear 109 produces an output by which it is detectable whether the free wheel hubs are locked or free and which can be used as an interlocking signal upon changing to the four wheel drive mode.

Since the empty chamber for receiving speed meter driven gear 109 is formed by front housing 63 which is separate from front case segment 46, clutch 31 and associated clutch support 59 to be provided on front wheel output shaft 26 may be assembled from the side remote from power transmission mechanism 27, also contributing to ease of assembly.

The rear end portion of driven shaft 30 having sprocket 33 secured thereto is extended into the interior of rear housing 64 attached to the rear end of rear case segment 47. A rotor 111 having a magnet attached thereto is fixedly retained on the rear end of driven shaft 30 by snap rings 112. The rear housing 64 is provided with a speed sensor 113 which can react to the magnet in rotor 111 to produce a signal.

In the automatic transmission/transfer 20 of the above-described arrangement, the two wheel drive mode is obtained by applying no hydraulic pressure to clutch 31 and thus keeping clutch 31 disconnected so that the power from engine 23 is transmitted to only rear wheel output shaft 25. The four wheel drive mode may be obtained by switching the requisite control valve in the hydraulic oil control unit, as will be described later, so as to introduce hydraulic oil under pressure into oil chamber 89 through hydraulic oil channels 97, 98, 100, and 101. Consequently, piston 86 is advanced against the action of return spring 91 to bring clutch plates 87 and friction plates 88 in pressure contact to connect driven shaft 30 to front wheel output shaft 26. The above-illustrated automatic transmission/transfer 20 has a reduced overall axial length because clutch 31 which provides a change between two and four wheel drive modes is located on the side of front wheel output shaft 26. This transmission/transfer can be loaded on such vehicles having a relatively short wheel base as small-size passenger cars without any particular troubles.

Figure 3:
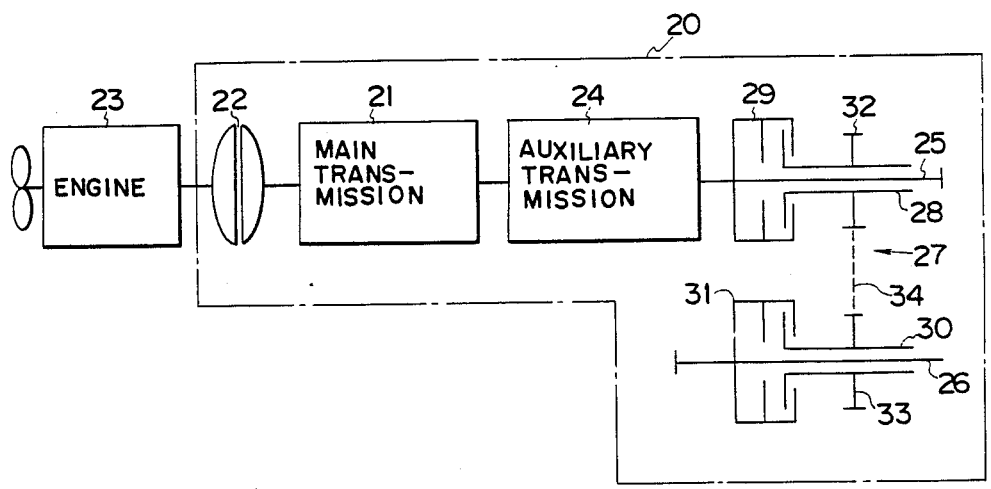
FIG. 3 is a schematic view illustrating the outline of a transmission/transfer according to another embodiment of the invention.

Another embodiment of the transfer for four wheel drive vehicles according to the present invention will be described. A general construction is schematically shown in FIG. 3. As seen from FIG. 3, this embodiment is the same as that shown in FIG. 1 except that another clutch 29 is added to the embodiment of FIG. 1 such that rear wheel output shaft 25 and power transmission mechanism 27 are selectively connected and disconnected thereby. In the following description, clutch 29 on the rear wheel output shaft 25 side is referred to as a first clutch, and clutch 31 on the front wheel output shaft 26 side is referred to as a second clutch. With respect to the same parts and arrangement as used in FIG. 2, no redundant reference is made in the following description.

In the arrangement shown in FIG. 3, a drive shaft 28 is coaxially mounted on rear wheel output shaft 25 which is substantially integral with the output shaft of auxiliary transmission 24 having a parking means built therein. Disposed between rear wheel output shaft 25 and drive shaft 28 is first clutch 29 for providing a change between two and four wheel drive modes.

When the four wheel drive mode is selected in the transfer of the present invention schematically illustrated in FIG. 3, both first and second clutches 29 and 31 are connected to allow the driving force of rear wheel output shaft 25 to be transmitted to driven shaft 30 through first clutch 29, drive shaft 28, and chain 34 and then from driven shaft 30 to front wheel output shaft 26 through second clutch 31. That is, the driving force produced by engine 23 is transmitted to both rear and front wheel output shafts 25 and 26 so that all four front and rear wheels are driven. In case of two wheel drive, both clutches 29 and 31 are disconnected so that the power is transmitted to only rear wheel output shaft 25. Although a rotational force is introduced to the side of front wheel output shaft 26 due to the rotation of the front wheels during run, only front wheel output shaft 26 is rotated, but power transmission mechanism 27 is not rotated due to disengagement of second clutch 31. Consequently, the power loss associated with the two wheel drive is reduced.

A predominant portion of the transfer shown in FIG. 3 is illustrated in FIG. 4. The auxiliary transmission 24 is illustrated in FIG. 4 as being enclosed in a transmission case 44 and comprising a planetary gear mechanism 35, a clutch 36, and a brake 37 which are arranged so as to provide a change between the high speed drive (H) and the low speed drive (L). A sun gear 39 is fixed secured to a drive shaft 38 which is the output shaft of main transmission 21. The sun gear 39 is integrally connected to a clutch hub 40. The planetary gear mechanism 35 includes a carrier 41 which is integrally connected to rear wheel output shaft 25 at one end and to a clutch drum 42 at the other end. The brake 37 is disposed outside a ring gear 43 and adapted to fixedly engage ring gear 43 and release the engagement. Therefore, auxiliary transmission 24 is designed to change the rotation of rear wheel output shaft 25 between the high and low speed drives (H) and (L) by connecting clutch 36 and releasing brake 37 from retaining ring gear 43, or by disconnecting clutch 36 and retaining ring gear 43 by brake 37. A parking means P1 is also provided which prevents the rotation of rear wheel output shaft 25 by utilizing clutch drum 42 integrally connected thereto. More particularly, a parking gear Pg is formed on the outer periphery of clutch drum 42. A parking lock pawl Pb is provided outside the transmission case such that it is engaged with and released from parking gear Pg in cooperation with a shift lever (not shown).

To the end (rear end as loaded on a vehicle) of transmission case 44 having auxiliary transmission 24 received therein is attached chain chamber-defining case 45. The chain chamber-defining case 45 is configured to have a hollow extension radially extending from rear wheel output shaft 25 and designed so as to be divided at the center into front and rear case segments 46 and 47 as previously mentioned with respect to FIG. 2. The first clutch 29 is accommodated in an empty chamber defined between front case segment 46 and transmission case 44 while chain 34 and associated sprockets 32, 33 are disposed in another chamber defined between front and rear case segments 46 and 47. A rear housing 48 is secured to the rear end of rear case segment 47 in an axial direction of rear wheel output shaft 25 to define an empty chamber therein. The rear wheel output shaft 25 extends throughout chain chamber-defining case 45 and rear housing 48 bolted thereto and rearwardly protrudes beyond rear housing 48. The rear wheel output shaft 25 is provided at its protruded end with a companion flange 49 and on that side supported by a bearing 50 held in place in rear housing 48. The drive shaft 28 constituting a part of power transmission mechanism 27 is coaxially fitted on an intermediate portion of rear wheel output shaft 25. The drive shaft 28 at its opposed ends is supported for rotation by bearings 51 and 52 held in place in front and rear case segments 46 and 47, respectively. A hub 53 of first clutch 29 is formed integral with drive shaft 28. A clutch drum 54 of first clutch 29 is fitted and retained on rear wheel output shaft 25 by means of splines and a snap ring. The first clutch 29 is a hydraulic oil clutch designed such that the application of a hydraulic pressure to the back side of a piston brings friction and clutch plates in pressure engagement to connect rear wheel output shaft 25 to drive shaft 28. The rear wheel output shaft 25 is disconnected from drive shaft 28 by releasing the hydraulic pressure to restore the piston with the aid of a return spring, thereby cancelling the pressure engagement between friction and clutch plates.

On the intermediate portion of drive shaft 28 which is located in the space defined by front and rear case segments 46 and 47, sprocket 32 is fitted and ratined by means of splines and snap rings. Oil seals 55 are interposed between the outer periphery of front and rear bosses of sprocket 31 and corresponding shoulders on front and rear case segments 46 and 47. The chain chamber 56 is separated from the adjoining chambers by oil seals 55 and similar oil seals 79 on the side of driven shaft 30 as previously mentioned.

The rear housing 48 is attached to rear case segment 47 for the dual purposes of holding therein bearing 50 to support rear wheel output shaft 25, and accommodating therein a speed sensor 57. Since rear housing 48 is separate from chain chamber-defining case 45 and the empty chamber defined therein is separated from chain chamber 56, speed sensor 57 and accompanying parts are readily accessible with the advantage of ease of maintenance.

In FIG. 4, numeral 96 designates a hydraulic oil pressure control apparatus which governs a change between two and four wheel drive modes as well as a change of gear ratio in main and auxiliary transmissions 21 and 24.

Figure 5:
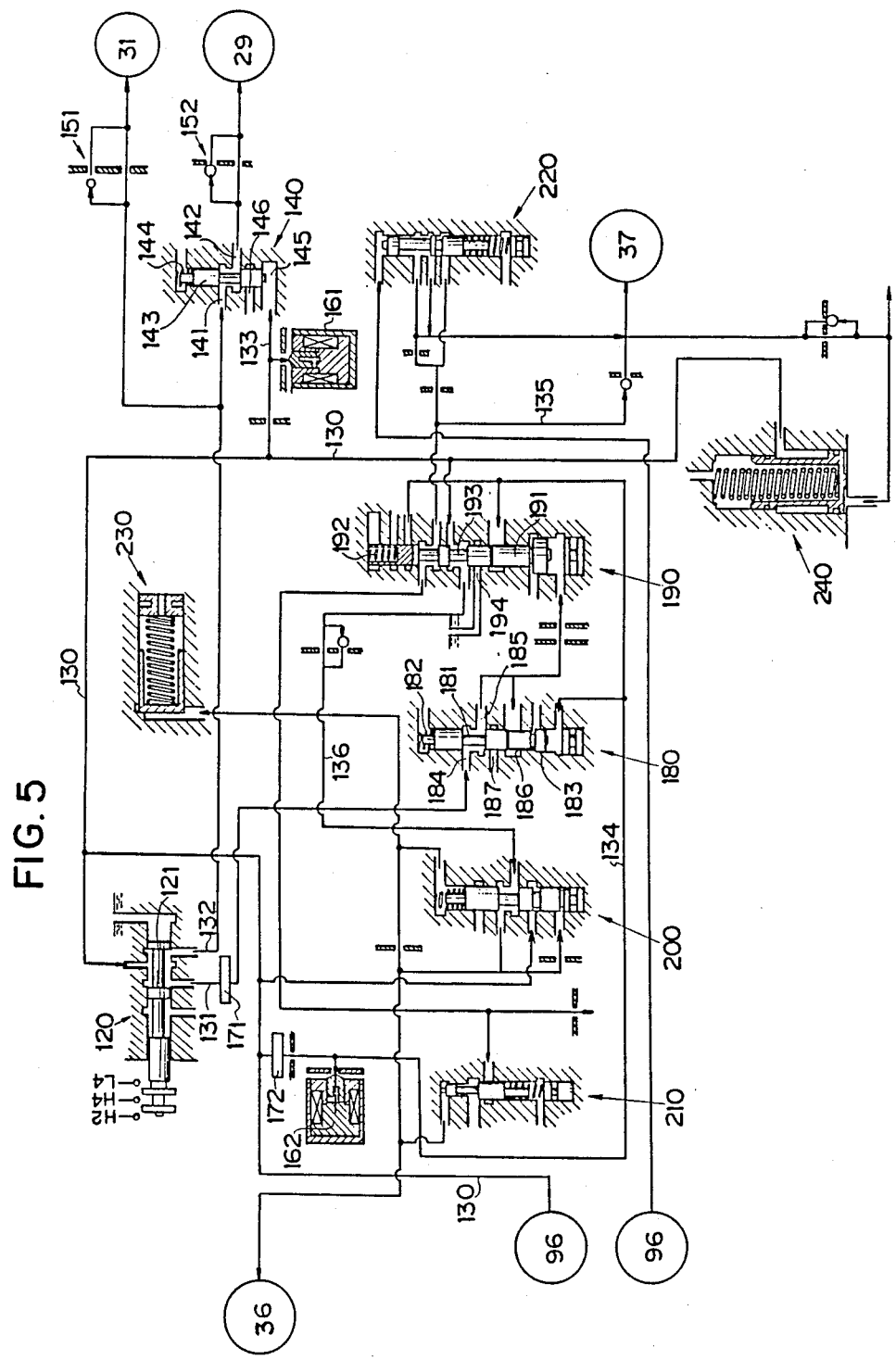
FIG. 5 is a diagram showing a hydraulic oil circuit used in one embodiment of the control apparatus according to the present invention.

The above-illustrated transfer allows a selection among three modes, high speed two wheel drive H2, high speed four wheel drive H4, and low speed four wheel drive L4 because of the provision of auxiliary transmission 24. A hydraulic oil circuit for performing the changeover control is illustrated in FIG. 5. In the following description with reference to FIG. 5, terms "upper" and "lower" correspond to the upper and lower sides as viewed in the sheet of FIG. 5 whose long side is placed lateral. In FIG. 5, a transfer manual valve 120 which is a speed change means has a spool 121 interlocked with a shift lever (not shown) located beside the driver's seat. The valve 120 is in communication with main oil pressure control apparatus 96 through a line 130 and has output lines 131 and 132 extended therefrom. The valve 120 is designed such that the oil pressure supplied from main oil pressure control apparatus 96 through line 130 is passed to only line 131 when the high speed two wheel drive H2 is selected, to both lines 131 and 132 when the high speed four wheel drive H4 is selected, and to only line 132 when the low speed four wheel drive L4 is selected. The line 132, which receives the oil pressure when the four wheel drive is selected, is communicated to an inlet port 141 of a timing valve 140 and to the above-mentioned two/four wheel drive changeover second clutch 31 through a flow rate control valve 151 having a check valve built therein. The timing valve 140 includes an outlet port 142, a spool 143, a spring 144 engaged with the upper end of spool 143, an oil chamber 145 exposed to the lower end of spool 143 and connected to line 130 through a line 133, and a drain port 146. The outlet port 142 is communicated to the above-mentioned two/four wheel drive changeover first clutch 29 through a flow rate control valve 152 having a check valve built therein. The timing valve 140 is designed to operate as follows. Urging of spool 143 by spring 144 toward the lower end closes inlet port 141 and brings outlet port 142 in communication with drain port 146 to release first clutch 29 from the oil pressure. On the contrary, application of the line pressure to oil chamber 145 causes spool 143 to move toward the upper end while compressing spring 144, thus bringing inlet and outlet ports 141 and 142 in fluid communication to apply the oil pressure to first clutch 29. Since an electromagnetic valve 161 is inserted in line 133, line 133 leading to oil chamber 145 may be closed by supplying electricity to the coil of electromagnetic valve 161 for excitation and opened by interrupting electricity for demagnetization. The electromagnetic valve 161 is controlled to turn on and off by a computer not shown in the figure. By operating the shift lever from the high speed two wheel drive H2 to the high or low speed four wheel drive H4 or L4, a corresponding signal is supplied to the computer which produces a signal after the lapse of a preset delay time T to turn off electromagnetic valve 161. By turning off of electromagnetic valve 161, line 133 is opened and the line pressure is thus applied to oil chamber 145 to urge spool 143 upward to bring inlet and outlet ports 141 and 142 in fluid communication so that the line pressure is applied to first clutch 29. Therefore, the application of the line pressure to first clutch 29 is delayed the preset time from that to second clutch 31, and timing valve 140 and electromagnetic valve 161 constitute a delay means.

The line 131 extending from transfer manual valve 120 is communicated to a relay valve 180 through an oil strainer 171. The relay valve 180 includes a spool 181, a spring 182 engaged with the upper end of spool 181, and a plunger 183 serving to urge spool 181 against the action of spring 182. The relay valve 180 is designed to operate as follows. By applying the line pressure to the lower side of plunger 183 through a line 134 having an oil strainer 172 and an electromagnetic valve 162 inserted therein, plunger 183 urges spool 181 upward to bring inlet and outlet ports 184 and 185 in fluid communication. Since outlet port 185 is in communication with an oil chamber 186 defined below spool 181, the line pressure is simultaneously applied to lower oil chamber 186 as a feedback pressure. Consequently, spool 181 is held displaced toward the upper end against spring 182. Thus only plunger 183 is moved down after line 134 is released of the line pressure by turning off electromagnetic valve 162. When transfer manual valve 120 is switched so as to release line 131 from the line pressure, spool 181 is moved downward by the action of spring 182 to close inlet port 184 and bring outlet port 185 in communication with a drain port 187.

An inhibitor valve 190 is provided for the purpose of controlling the engagement of clutch 36 and brake 37 in auxiliary transmission 24. The inhibitor valve 190 includes a spool 193, a spring 192 engaged with the upper end of spool 193, and a plunger 191 located below spool 193. The outlet port 185 of relay valve 180 is communicated to an oil chamber defined below plunger 191 in inhibitor valve 190. Then, the line pressure is applied to the lower side of plunger 191 through relay valve 180, causing plunger 191 to urge spool 193. When the line pressure from relay valve 180 is interrupted, plunger 191 is moved downward by the line pressure applied to the upper side of plunger 191 through line 134 so that spool 193 is moved down by the action of spring 192. The inhibitor valve 190 is designed so as to operate as follows. When spool 193 is held in the lower position, an oil chamber defined above spool 193 is communicated to line 134 connected to oil pressure supply line 130 through electromagnetic valve 162, an deceleration line 135 connected to brake 37 is communicated with oil pressure supply line 130, and a drain port 194 is communicated with a direct coupling line 136. On the contrary, when spool 193 is held in the upper position, the oil chamber above spool 193 is communicated with drain port 194 to release the chamber from the oil pressure, deceleration line 135 is communicated with drain port 194 to release brake 37 from the oil pressure, and direct coupling line 136 is communicated with oil pressure line 130.

The electromagnetic valve 162 located in line 134 downstream of oil strainer 172 is to develop in line 134 the oil pressure associated with a speed change region. It is turned on to release line 134 from the oil pressure when the vehicle running condition is in a speed change region from the high speed stage (H2 or H4) to the low speed stage (L4), and turned off to develop the oil pressure in line 134 when the vehicle running condition is in another speed change region from the low speed stage (L4) to the high speed stage (H2 or H4).

In FIG. 5, numeral 200 designates an accumulator control valve, 210 a shift timing valve, 220 an orifice control valve, and 230 and 240 accumulators.

Next, the cooperation of automatic transfer 20 shown in FIG. 4 and the hydraulic oil circuit shown in FIG. 5 will be described.

In the parking condition where the engine is stopped, no oil pressure is applied to clutches 29 and 31 which are disengaged to provide a disconnection regardless of whether the drive mode is set to the four or two wheel drive mode. The parking lock pawl Pb is engaged with parking gear Pg in first parking apparatus P1, and parking lock pawl 93 is engaged with parking gear 92 in second parking apparatus P2. The respective output shafts 25 and 26 are thus prevented from rotating so that all four wheels are locked, maintaining the standstill condition.

If the high speed two wheel drive mode H2 is selected by means of the shift lever after the engine is started, spool 121 of transfer manual valve 120 is moved to the left end in FIG. 5. Then line 130 for supplying the oil pressure comes in communication with line 131 while line 132 comes in communication with the drain line and is drained of the hydraulic oil. The two/four wheel drive changeover clutches 29 and 31 in communication with line 132 thus receive no oil pressure and are released. Consequently, power transmission mechanism 27 is disconnected from both rear and front wheel output shafts 25 and 26 so that the power is not transmitted to front wheel output shaft 26, establishing the two wheel drive. The power transmission mechanism 27 is kept stationary even when the vehicle is running. In this case, since the shift lever is set to the high speed two wheel drive mode H2, a corresponding H4 flag becomes low as shown in the flow chart of FIG. 6, so that electromagnetic valve 161 constituting the delay means is turned on in response to a signal from the computer. The line 133 which has been in communication with oil chamber 145 of timing valve 140 is closed, and timing valve spool 143 is moved downward by the action of spring 144 to thereby close inlet port 141 and bring outlet port 142 in communication with drain port 146.

On the other hand, the oil pressire is applied to inlet port 184 of relay valve 180 through line 131. If at this point, spool 181 is urged upward by plunger 183 by the application of the oil pressure through line 134 because of turning off of electromagnetic valve 162, then inlet port 184 comes in communication with outlet port 185. The oil pressure is then applied to the lower side of spool 181 as a feedback pressure so that spool 181 is held at the upper position. At the same time, the oil pressure is applied to the lower side of plunger 191 of inhibitor valve 190. In inhibitor valve 190, plunger 191 urges spool 193 upward to bring oil pressure supply line 130 in communication with direct coupling line 136. Consequently, the oil pressure is applied to clutch 36 of auxiliary transmission 24 through accumulator control valve 200 to convert clutch 36 into connected or engaged state. That is, drive shaft 38 which is an input shaft to auxiliary transmission 24 is directly coupled to rear wheel output shaft 25 through carrier 41 of planetary gear mechanism 35. At the same time, upward movement of spool 193 of inhibitor valve 190 brings deceleration line 135 in communication with drain port 194 to release deceleration line 135 from the oil pressure, thereby releasing brake 37.

It is now assumed that the vehicle is driven with the foregoing setting. If the free wheel hubs of the front wheels are locked, the rotation of the front wheels is transmitted to front wheel output shaft 26 to rotate it. However, since second clutch 31 disconnects driven shaft 30 from front wheel output shaft 26, no rotational force is transmitted to driven shaft 30 so that power transmission mechanism 27 remains stationary. Thus the two wheel drive does not accompany the unnecessary rotation of power transmission mechanism 27 so that the power loss is correspondingly reduced and the temperature rise of lubricant oil is suppressed at the same time. With the free wheel hubs of the front wheels being locked, front wheel output shaft 26 is rotated by the rotational force of the front wheels and a sensor (not shown) is thus actuated through speed meter driven gear 109 in mesh with speed meter drive gear 110 affixed to the shaft. If the free wheel hubs are free, front wheel output shaft 26 is not rotated and the sensor not actuated. Therefore, the output of the sensor may be used to judge whether the free wheel hubs are locked or free. The output of the sensor by which it is judged that the free wheel hubs are free is also used as an interlocking signal for preventing a change to four wheel drive or an alarm signal of representing the suspended change to four wheel drive. Alternatively, a standby signal for providing a standby state ready for a change to four wheel drive may be produced when a great difference is observed between the output of the sensor for detecting the rotation of front wheel output shaft 26 and the output of the speed sensor 57 associated with rear wheel output shaft 25 during the two wheel drive run.

When the high speed four wheel drive H4 is selected by means of the shift lever in order to provide a change from two wheel drive to four wheel drive, spool 121 of transfer manual valve 120 is set at the position illustrated in FIG. 5 where oil pressure supply line 130 comes in communication with both lines 131 and 132. Consequently, the oil pressure is applied to oil chamber 89 of second clutch 31 through line 132 and illustratively, oil channels 97, 98, 100 and 101 shown in FIG. 4.

Figure 6:
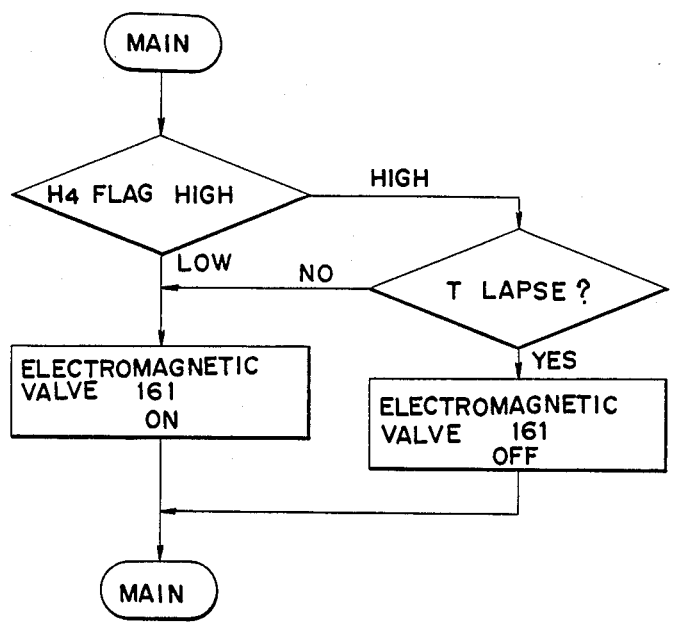
FIG. 6 is a flow chart associated with the control of the hydraulic oil circuit of FIG. 5.
Figure 7:
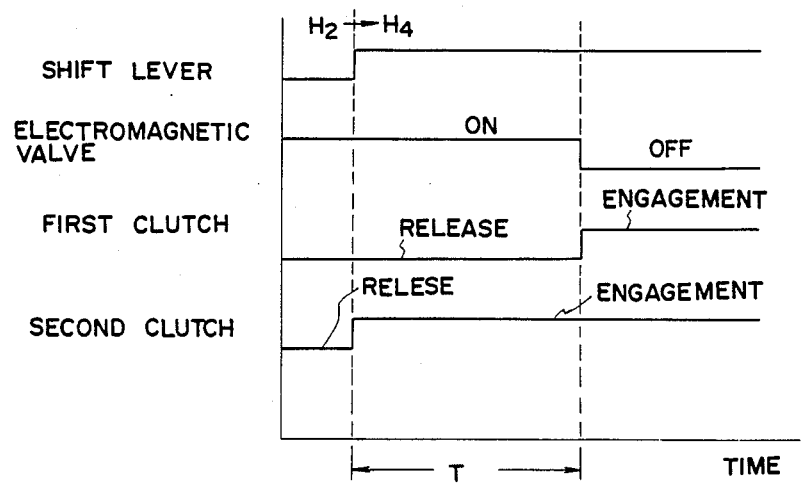
FIG. 7 is a time chart associated with the control of the hydraulic oil circuit of FIG. 5.

Piston 86 is advanced, while compressing return spring 91, to bring clutch plates 87 and friction plates 88 in pressure contact to accomplish a connection between driven shaft 30 and front wheel output shaft 26. That is, second clutch 31 is changed into the connected state immediately after the requisite operation of the shift lever. Although the H4 flag is changed to high in response to the change of the shift lever, electromagnetic valve 161 is maintained on until the lapse of the preset delay time T as shown in FIG. 6. The line 133 is thus closed, no oil pressure applied to oil chamber 145 of timing valve 140, and spool 143 moved downward by the action of spring 144 to keep inlet port 141 closed. Thus no oil pressure is applied to first two/four wheel drive changeover clutch 29. Therefore, the oil pressure is applied to only second clutch 31 immediately after the shift lever change. When a change is made from the high speed two wheel drive H2 to high speed four wheel drive H4 during the vehicle run, power transmission mechanism 27 first begins to rotate upon receipt of the rotational force from the front wheels. At the end of the delay time T after the shift lever change, the computer develops a signal to turn off electromagnetic valve 161. The line 133 is thus opened and the oil pressure applied to oil chamber 145 of timing valve 140 to urge spool 143 against the action of spring 144. Consequently, inlet and outlet ports 141 and 142 are in communication and the oil pressure is applied to first clutch 29 to convert it into the connected state. That is, first clutch 29 is connected at the end of lapse of the preset delay time T after second clutch 31 has been connected. Consequently, power transmission mechanism 27 is rotated and cooperated with front wheel output shaft 26 before the power is transmitted thereto from rear wheel output shaft 25. The timing of changes of the aforementioned shift lever, electromagnetic valve 161, and first and second clutches 29 and 31 is shown in the time chart of FIG. 7. Since the rotation of power transmission mechanism 27 and the transmission of power thereto are separately performed, it is avoided to perform both rotation and power transmission when both clutches 29 and 31 are in transient engagement state.

When the shift lever is changed from the high speed two wheel drive H2 to the high speed four wheel drive H4, the other line 131 of transfer manual valve 120 receives the oil pressure from line 130 as in the previously described change operation. The clutch 36 of auxiliary transmission 24 is maintained in the connected state and brake 37 maintained in the released state. Thus drive shaft 38 and rear wheel output shaft 25 are maintained directly coupled.

When the shift lever is changed from the high speed two wheel drive H2 to the low speed four wheel drive L4, spool 121 of transfer manual valve 120 is moved to the right end in FIG. 5 to bring oil pressure supply line 130 in communication with only line 132 and bring line 131 in communication with the drain port to release it from the oil pressure. Also in this case, electromagnetic valve 161 is maintained on to close line 133 to maintain timing valve 140 in the closed state until the lapse of the delay time T after the H4 flag is changed to high as shown in the flow chart of FIG. 6. At the end of the delay time T, electromagnetic valve 161 is turned off to open line 133 to convert timing valve 140 into the open state. That is, first clutch 29 is connected at the end of lapse of the preset delay time T after second clutch 31 has been connected. It is thus avoided to concurrently perform both rotation and power transmission through power transmission mechanism 27 when both clutches 29 and 31 are in transient engagement state. When changed to the low speed four wheel drive L4, the turning on of electromagnetic valve 162 causes line 134 to be released from the oil pressure, allowing relay valve plunger 183 to move downward. In addition, line 131 is also released from the oil pressure by transfer manual valve 120. The relay valve spool 181 is urged downward by the action of spring 182. No oil pressure is thus applied to the lower side of inhibitor valve plunger 191, and plunger 191 and spool 193 are at their lower position. Consequently, direct coupling line 136 is communicated with drain port 194 and thus released from the oil pressure, thereby releasing clutch 36 of auxiliary transmission 24. The oil pressure supply line 130 is communicated with deceleration line 135. The oil pressure is thus applied to brake 37 through line 135 to hold brake 37 in engagement with ring gear 43, thus stopping the rotation of ring gear 43. As a result, drive shaft 38 is connected to rear wheel output shaft 25 through sun gear 39, pinion, and carrier 41 so that the rotation of drive shaft 38 is transmitted to rear wheel output shaft 25 at the reduction gear ratio.

When a change is made from the high speed four wheel drive H4 to the low speed four wheel drive L4, oil pressure supply line 130 is maintained in communication with line 132 and electromagnetic valve 161 maintained off whereas line 131 is released from the oil pressure. The clutch 36 of auxiliary transmission 24 is released and brake 37 engaged, so that the rotation of drive shaft 38 is transmitted to rear wheel output shaft 25 through planetary gear mechanism 35 at its reduction gear ratio.

In the above-described apparatus, when a change is made from the two wheel drive to the four wheel drive, first and second two/four wheel drive changeover clutches 29 and 31 are successively engaged at an interval of the predetermined delay time T so that rotation transmission and power transmission are separately started. Consequently, respective clutches 29 and 31 are stabilized in their transient engagement state and thus improved in durability as well as power transmission mechanism 27.

As understood from the foregoing description of operation, chain 34 is first operated at the time of four wheel drive. Since chain 34 is accommodated in chain chamber 56 separated by partition 81 and oil seals 55, 79, it does not occur that abraded debris of chain 34 is conveyed to clutches 29, 31 and the bearings by the lubricant. Any particular reduction in life time of clutches 29, 31 and bearings is prohibited.

Figure 8:
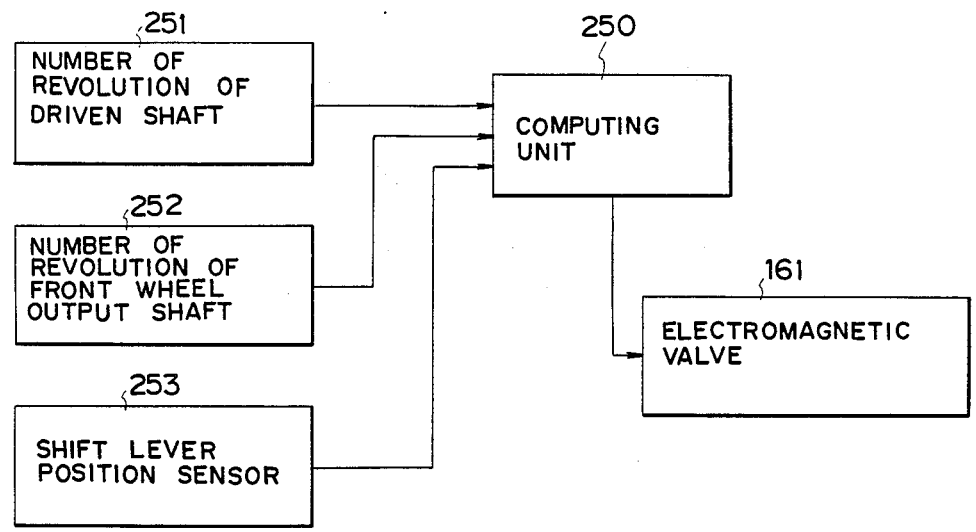
FIG. 8 is a block diagram showing an arrangement for controlling an electromagnetic valve of the delay means shown in FIG. 5.
Figure 9:
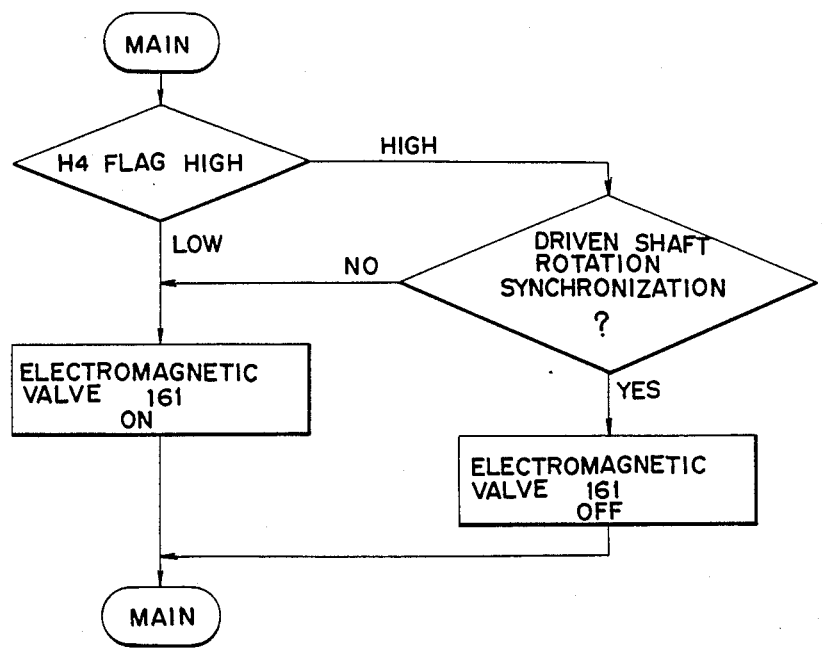
FIG. 9 is a flow chart associated with the control of the valve.

The delay means comprising timing valve 140 and electromagnetic valve 161 functions to allow first clutch 29 to be engaged after second clutch 31 has been engaged at the time of change from the two wheel drive (H2) to the four wheel drive (H4 or L4). For this purpose, instead of the arrangement wherein electromagnetic valve 161 is turned off after the lapse of the preset delay time T, there may be employed another arrangement wherein electromagnetic valve 161 is turned off by detecting that power transmission mechanism 27 is integrally coupled with front wheel output shaft 26 through second clutch 31. That is, since complete engagement of second clutch 31 causes power transmission mechanism 27 and front wheel output shaft 26 to rotate together, the engagement state of second clutch 31 is detectable by counting the number of revolution of poer transmission mechanism 27. Particularly in the transfer shown in FIG. 4, there are provided the speed meter comprising driven and drive gears 109 and 110 for counting the number of revolution of front wheel output shaft 26 and speed sensor 113 associated with rotor 111 on driven shaft 30 for counting the number of revolution of power transmission mechanism 27. These sensors may be utilized to control the timing of turning off electromagnetic valve 161. A typical control apparatus effective for this purpose is schematically illustrated in the block diagram of FIG. 8. A computing unit 250 receives a signal 251 indicative of the number of revolution of driven shaft 30 available from speed sensor 113, a signal 252 indicative of the number of revolution of front wheel output shaft 26 available from the speed meter associated with driven gear 109, and an output 253 of a sensor for sensing the position of the shift lever of auxiliary transmission 24. The computing unit 250 compares the input signals indicative of number of revolution provided that the shift lever is set to the four wheel drive (H4 or L4) and produces a signal of turning off electromagnetic vave 161 when the difference between the input signals approaches approximately zero. The control operation of this apparatus is illustrated in the flow chart of FIG. 9. If the shift lever is set to the high speed two wheel drive H2, the H4 flag becomes low to maintain electromagnetic valve 161 on. Thus timing valve 140 is in the closed state. When the shift lever is changed from the high speed two wheel drive H2 to the high speed four wheel drive H4 or low speed four wheel drive L4, the H4 flag becomes high and the signal 251 indicative of number of revolution of driven shaft 30 is compared with the signal 252 indicative of number of revolution of front wheel output shaft 26 by computing unit 250. Since spool 121 of transfer manual valve 120 is moved by the shift lever, the oil pressure is applied to line 132 and hence, to second clutch 31 as previously mentioned. The conversion of second clutch 31 from release to connection allows the rotation of front wheel output shaft 26 to be transmitted to power transmission mechanism 27 through driven shaft 30. In the transient engagement state of second clutch 31, the rotation of drive shaft 30 is not completely synchronous with that of front wheel output shaft 26 because of sliding in the second clutch. While there remains a great difference between the numbers of rotation of these shafts, electromagnetic valve 161 is maintained on. The power transmission mechanism 27 and driven shaft 30 increase their number of revolution. When second clutch 31 is completely engaged, the number of revolution of driven shaft 30 becomes equal to that of front wheel output shaft 26. At this point, computing unit 250 develops a signal to turn off electromagnetic valve 161. As a result, the oil pressure is applied to oil chamber 145 of timing valve 140 to urge spool 143 upward. With timing valve 140 open, the oil pressure is applied from line 132 to first clutch 29 through timing valve 140 to change first clutch 29 into the connected state.

Figure 10:
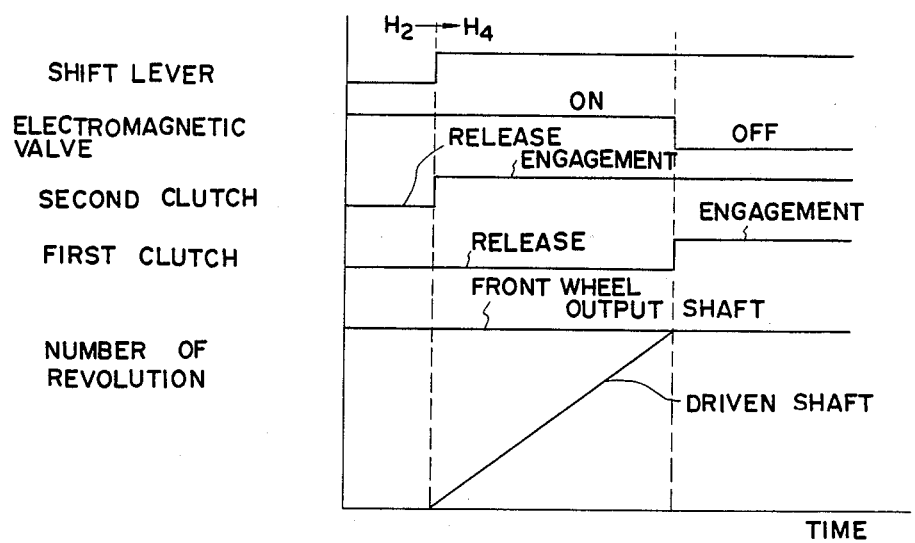
FIG. 10 is a time chart associated with the control of the valve.

The above-mentioned process of changing is illustrated in the timing chart of FIG. 10.

Also in the above-described apparatus, second clutch 31 is connected before first clutch 29 is connected, and this delay of clutch connection is set by detecting that second clutch 31 has been connected. Consequently, respective clutches 29 and 31 are stabilized in their transient engagement state.

Figure 11:
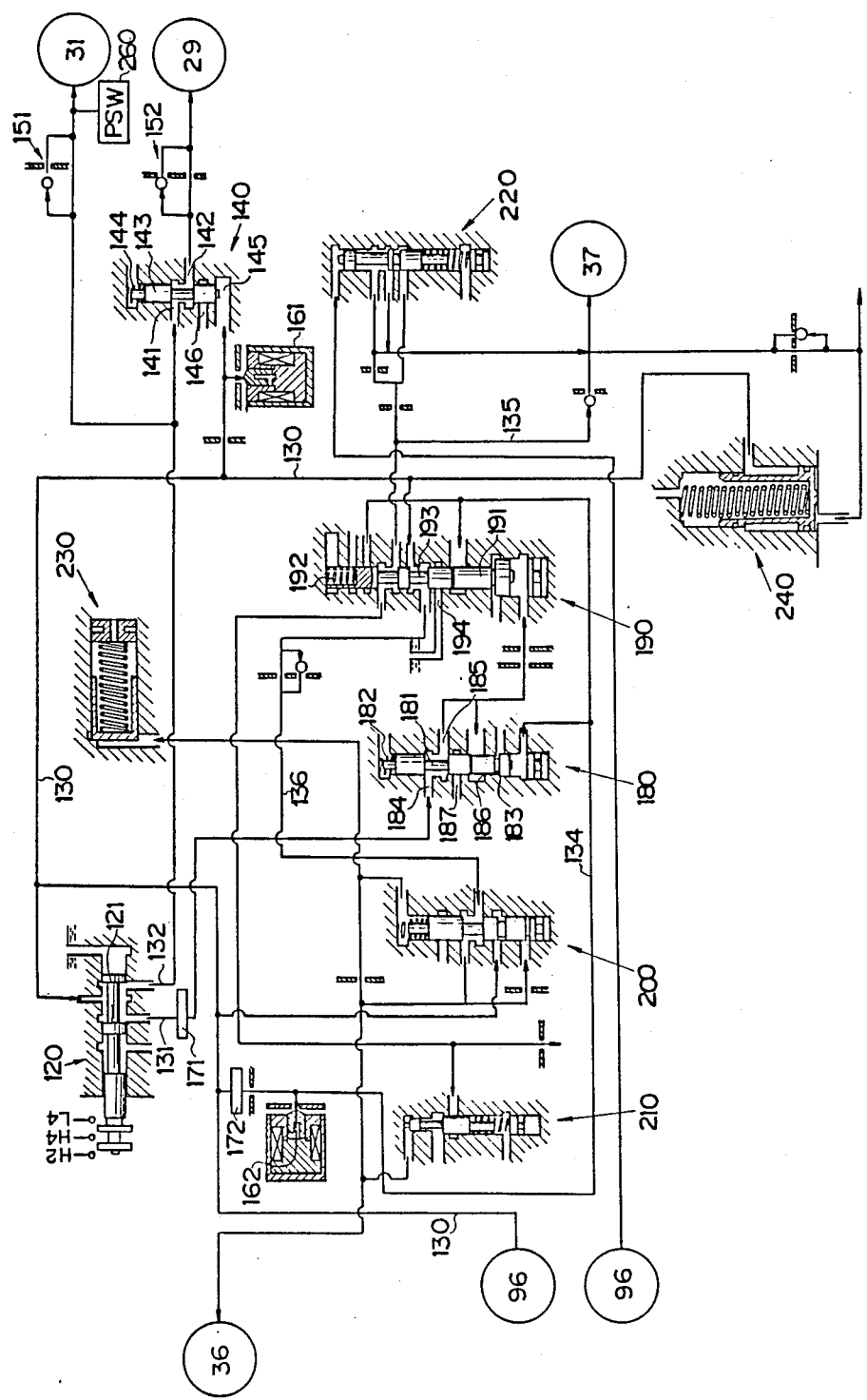
FIG. 11 is a diagram showing a hydraulic oil circuit used in a second embodiment of the control apparatus according to the present invention.

FIG. 11 illustrates a hydraulic oil circuit useful in a further embodiment of the present invention. Since the connection of a hydraulic clutch is accomplished when the pressure applied thereto reaches the predetermined level, the control apparatus including the oil circuit shown in FIG. 11 is designed such that the connection of first clutch 29 is started when the oil pressure applied to second clutch 31 reaches the predetermined level. Therefore, the oil rircuit of FIG. 11 is substantially the same as that of FIG. 5 except that a pressure switch 260 is inserted between second clutch 31 and upstream flow rate control valve 151 having a check valve built therein and that electromagnetic valve 161 of the delay means is turned off in response to an output signal of pressure switch 260.

Figure 12:
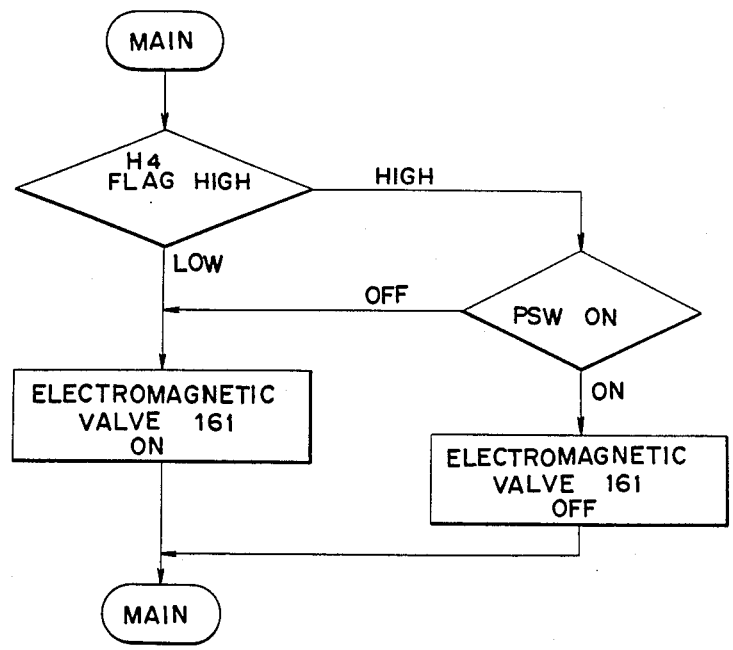
FIG. 12 is a flow chart associated with the control of the hydraulic oil circuit of FIG. 11.

The control operation of the control apparatus having the oil circuit shown in FIG. 11 is illustrated in the flow chart of FIG. 12. With the shift lever set to the high speed two wheel drive H2, the H4 flag becomes low to turn on electromagnetic valve 161 of the delay means, which closes line 133 to maintain timing valve 140 in the closed state. When the shift lever is changed from the high speed two wheel drive H2 to the four wheel drive (H4 or L4), the H4 flag is changed to high and line 130 communicates with line 132 through transfer manual valve 120. The oil pressure is then applied to second clutch 31. However, pressure switch 260 remains off for a certain initial period of oil supply when the oil pressure is still below the predetermined level. The electromagnetic valve 161 is accordingly maintained on so that line 133 is closed and no oil pressure is applied to oil chamber 145. Consequently, timing valve 140 is maintained closed and no oil pressure is applied to first clutch 29, leaving first clutch 29 released. In the course of applying the oil pressure to second clutch 31, the oil pressure slowly increases while the piston is moving, but jumps up when the clutch plates come in engagement. At this point, the oil pressure reaches the predetermined level to turn on pressure switch 260 which produces an output signal, by which electromagnetic valve 161 is turned off to open line 133. The oil pressure is applied to oil chamber 145 of timing valve 140 to move spool 143 upward to bring inlet and outlet ports 141 and 142 in communication. The oil pressure is then applied to first clutch 29. That is, after the oil pressure in second clutch 31 has increased to the predetermined level and after second clutch 31 has substantially completely connected front wheel output shaft 26 and power transmission mechanism 27 so that they synchronously rotate, first clutch 29 is brought into engagement to transmit the power from rear wheel output shaft 25 to power transmission mechanism 27. This changing process is illustrated in the timing chart of FIG. 13.

Figure 13:
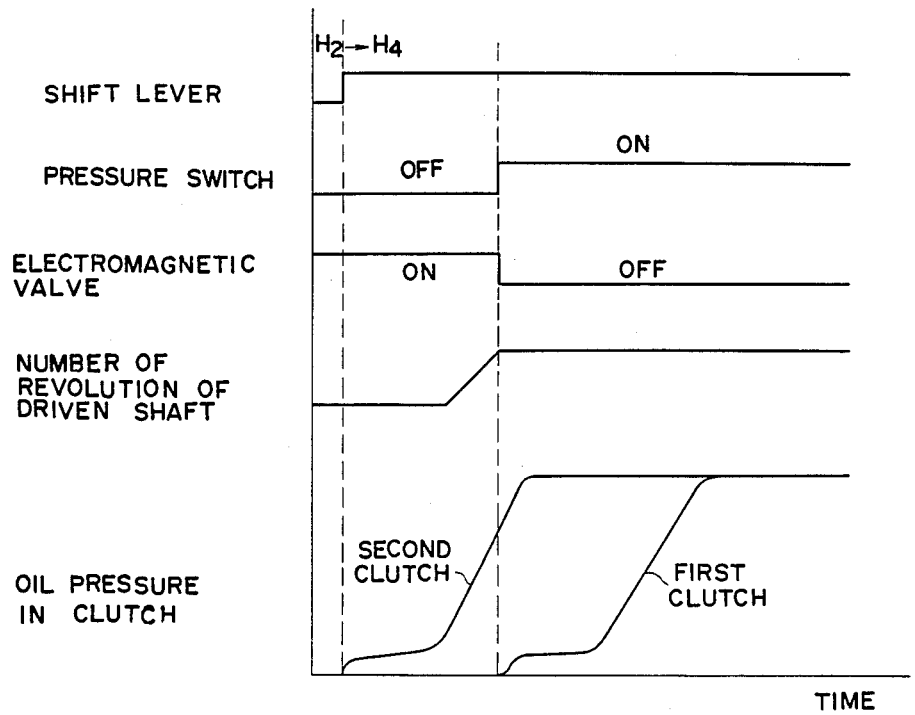
FIG. 13 is a time chart associated with the control of the hydraulic oil circuit of FIG. 11.
Figure 15:
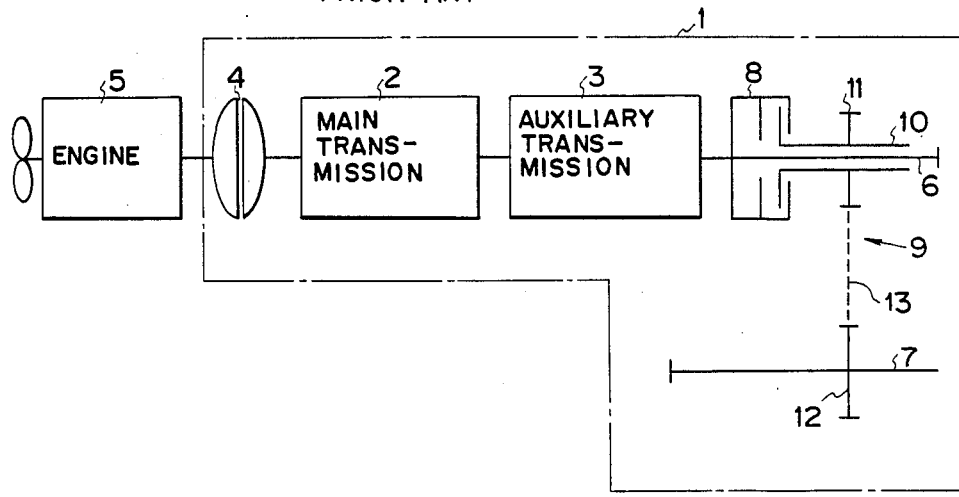
FIG. 15 is a schematic view illustrating one typical prior art four wheel drive vehicle transmission/transfer.

As shown in FIG. 13, the above-mentioned apparatus is designed such that pressure switch 260 is turn on at a point of time when the oil pressure in second clutch is somewhat lower than the line pressure, and electromagnetic valve 161 is correspondingly turned off in order to change timing valve 140 into the open state. Since the second clutch 31 is completely engaged by the increase of the applied oil pressure to the line pressure and the changing of timing valve 140 into the open state is effected by the supply of the line pressure oil into oil chamber 145, the delay of timing of connecting clutches 29 and 31 may be set by applying the pressure available at the site of pressure switch 260 to oil chamber 145 of timing valve 140. FIG. 14 illustrates a hydraulic oil circuit having such a function added. A branch 137 is extended from the line between second clutch 31 and upstream flow rate control valve 151 having a check valve built therein, and connected to oil chamber 145 of timing valve 140. When a change is made from the high speed two wheel drive H2 to the four wheel drive (H4 or L4) in the apparatus shown in FIG. 14, the oil pressure is applied to second clutch 31 through line 132. As the pressure applied gradually increases as previously shown in FIG. 13, second clutch 31 becomes completely engaged. At the same time, the pressure oil is supplied to timing valve oil chamber 145. Consequently, approximately at the same time as second clutch 31 has become engaged, timing valve spool 143 is forced upward to bring inlet and outlet ports 141 and 142 in communication to eventually apply the oil pressure to first clutch 29. That is, since first clutch 29 becomes engaged after second clutch 31 has become engaged, power transmission mechanism 27 is first connected to front wheel output shaft 26 so that they synchronously rotate, and rear wheel output shaft 25 is then connected to power transmission mechanism 27 to transmit the power to the latter.

In the embodiment shown in FIG. 4, parking means P1 and P2 utilize clutch drums 42 and 84. However, the parking means used in the present invention are not limited with respect to organization and location as long as they can inhibit the rotation of rear and front wheel output shafts 25 and 26 by fixedly retaining them to predetermined fixed members.

In the description of the foregoing embodiments of the present control apparatus, first clutch 29 is connected after second clutch 31 has been connected. The present invention, however, is not limited with respect to the order of connection of these clutches. It suffices that among two clutches provided at the upstream and downstream stages of the power transmission mechanism for providing a change between two and four wheel drive modes, any one first becomes engaged and the other one thereafter become engaged.

We claim:

1. A transfer for a four wheel drive vehicle having an engine and front and rear wheels, comprising:
   a transmission mechanism for changing the speed of rotation input from the engine,
   a first output shaft for transmitting the power output from the transmission mechanism to one of the front and rear wheels,
   a second output shaft extended substantially parallel to said first output shaft for transmitting the power to the other of the front and rear wheels, and
   a power transmission mechanism for transmitting the power from said first output shaft to said second output shaft,
   a first clutch coaxially mounted on said first output shaft and comprising means for selectively connecting and disconnecting said power transmission mechanism to and from said first output shaft, and
   a second clutch coaxially mounted on said second output shaft and controlled separately from said first clutch for selectively connecting and disconnecting said second output shaft to and from said power transmission mechanism, wherein said first and second clutches cooperate to provide a change between two and four wheel drive modes.

2. The transfer of claim 1 wherein said power transmission mechanism comprises:
   a drive shaft coaxially mounted on said first output shaft and adapted to be selectively connected to and disconnected from said first output shaft by the first clutch,
   a sprocket attached to said drive shaft,
   a driven shaft coaxially mounted on said second output shaft and adpated to be selectively connected to and disconnected from said second output shaft by said second clutch,
   a sprocket attached to said driven shaft, and
   an endless gearing member extended around two said sprockets.

3. The transfer of claim 2 wherein said endless gearing member is comprised of a chain.

4. The transfer of claim 1 wherein said transmission mechanism comprises:
   a main transmission coupled to the engine, having an output shaft, and capable of speed change among plural forward gear ratios and one backward gear ratio, and
   an auxiliary transmission coupled to said main transmission, having an output shaft, and capable of speed reduction of the rotation input from said main transmission, the output shaft of said auxiliary transmission being said first output shaft.

5. The transfer of claim 4 wherein said auxiliary transmission comprises:
   a planetry gear mechanism including a sun gear fixedly mounted on the output shaft of said main transmission, a planetary pinion, a ring gear, and a planetary carrier connected to said first output shaft,
   a clutch for selectively connecting and disconnecting said planetary carrier to and from said sun gear, and
   a brake for selectively retaining and releasing said ring gear,
   whereby the rotation of said main transmission is input to said ring gear.

6. The transfer of claim 1 further comprising:
   first parking means for stopping the rotation of said first output shaft, and
   second parking means for stopping the rotation of said second output shaft.

7. The transfer of claim 6 wherein:
   said first parking means comprises a first parking gear formed substantially integral with said first output shaft and a first parking lock pawl adapted to engage said first parking gear to stop its rotation, and
   said second parking means comprises a second parking gear formed substantially integral with said second output shaft and a second parking lock pawl adapted to engage said second parking gear to stop its rotation.

8. A control apparatus in combination with a transfer for a four wheel drive vehicle having an engine and front and rear wheels, said transfer comprising:
   a transmission mechanism for changing the speed of rotation input from the engine,
   a first output shaft for transmitting the power output from the transmission mechanism to one of the front and rear wheels,
   a second output shaft for transmitting the power to the other of the front and rear wheels,
   a power transmission mechanism for transmitting the power from said first output shaft to said second output shaft,
   a first two/four wheel drive changeover clutch coaxially mounted on said first output shaft and controlled by said control apparatus for selectively connecting and disconnecting said first output shaft to and from said power transmission mechanism, and a second two/four wheel drive changeover clutch coaxially mounted on said second output shaft and controlled by said control apparatus independently from said first clutch for selectively connecting and disconnecting said second output shaft to and from said power transmission mechanism;

wherein said control apparatus operatively associated with the first and second clutches includes delay means for first rendering one of the first and second clutches engaged and thereafter rendering the remaining clutch engaged with a time lag.

9. The control apparatus of claim 8 wherein said power transmission mechanism comprises:

a drive shaft coaxially mounted on said first output shaft and adapted to be selectively connected to and disconnected from said first output shaft by said first clutch, a sprocket attached to said drive shaft, a driven shaft coaxially mounted on said second output shaft and adapted to be selectively connected to and disconnected from said second output shaft by said second clutch, a sprocket attached to said driven shaft, and an endless gearing member extended around two said sprockets.

10. The control apparatus of claim 9 wherein each of said first and second clutches is a hydraulic clutch operable with an oil pressure, a first line for supplying the oil pressure to said first clutch is branched from a second line for supplying the oil pressure to said second clutch, and said delay means includes a valve inserted in said first line and adapted to be opened after the oil pressure has been applied to said second clutch.

11. The control apparatus of claim 10 wherein said valve is a spool valve comprising a spool, a pair of oil chambers defined at the opposed ends of said spool, and a compression spring seated in one of said oil chambers and engaged with one of said spools whereby said first line is opened by applying the oil pressure to the other oil chamber to move said spool.

12. The control apparatus of claim 11 wherein said second line has a flow rate control valve inserted therein, and a line branched from said second line between said flow rate control valve and said second clutch is in fluid communication with the other oil chamber of said spool valve.

13. The control apparatus of claim 11, further comprising:

a solenoid valve inserted in a line in communication with the other oil chamber, and means for actuating said solenoid valve after the lapse of a predetermined time from the application of the oil pressure to the second line.

14. The control apparatus of claim 13 wherein said means for actuating the solenoid valve comprising a pressure switch inserted in said second line, said pressure switch being actuated when the oil pressure applied to said second clutch reaches a predetermined level and produces a signal for actuating the solenoid valve.

15. The control apparatus of claim 14 including means for applying the oil pressure to the other oil chamber of the valve when the solenoid is turned off.

16. The control apparatus of claim 15 including means for turning off valve in response to an output signal of said pressure switch.

17. The control apparatus of claim 13 including means for applying the oil pressure to the other oil chamber of the valve when the solenoid valve is turned off.

18. The control apparatus of claim 17 wherein said means for actuating the solenoid valve comprises:

means for sensing the rotational speed of said driven shaft, means for sensing the rotational speed of said power transmission mechanism, means for sensing the rotational speed of said second output shaft, means for comparing the rotational speed of the second output shaft with rotational speed of the power transmission mechanism and the driven shaft, and means for transmitting a signal to the solenoid valve, whereby said solenoid valve is turned off when the difference in rotational speed between said power transmission mechanism and said second output shaft becomes substantially zero.

19. The control apparatus of claim 17 including means for turning off said solenoid valve when the difference in rotational speed between said driven shaft and said second output shaft becomes substantially zero.

* * * * *